Nov. 8, 1966 J. J. MOORE 3,284,674
COUPLING CIRCUIT FOR AN ELECTRICAL READOUT INTEGRATOR
Filed Oct. 22, 1962
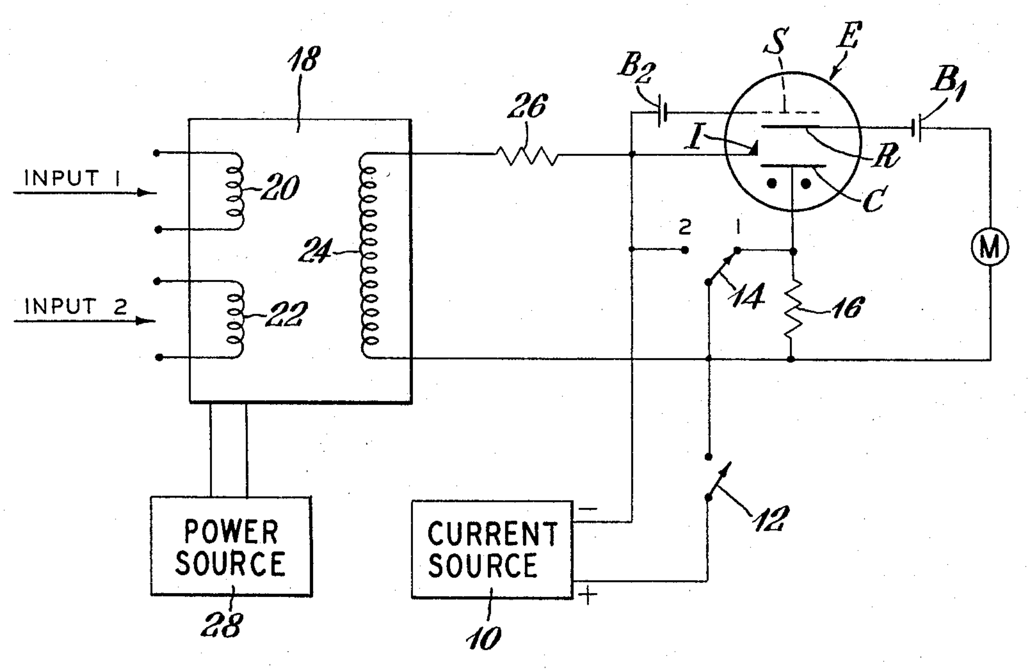
INVENTOR.
JAMES J. MOORE
BY John R. Doherty
ATTORNEY United States Patent Office 3,284,674

Patented Nov. 8, 1966

3,284,674
COUPLING CIRCUIT FOR AN ELECTRICAL READOUT INTEGRATOR

James J. Moore, Austin, Tex., assignor to Union Carbide Corporation, a corporation of New York Filed Oct. 22, 1962, Ser. No. 232,133
5 Claims. (Cl. 317—231)

The present invention relates to an input coupling circuit for an electrical readout integrator and refers more particularly to such a coupling circuit employing a magnetic amplifier.

In application Serial No. 777,009, filed on November 28, 1958, by Nelson N. Estes, now U.S. Patent No. 3,021,-482, issued on February 13, 1962, there is disclosed and claimed an electrochemical device referred to therein as an "electrical readout integrator." Such a device has the ability to integrate an electrical signal applied to it over a period of time. It has found use in a number of circuits; for instance, it has been used to integrate the signal from a linear accelerometer of the type employing electrochemical detectors as disclosed and claimed in application Serial No. 136,537, filed on September 7, 1961, now abandoned, by Kenneth W. Hannah.

In some circuits employing an electrical readout integrator, it is desirable to couple more than one input signal into the integrator while at the same time maintaining isolation to D.C. between the separate input signals. Thus in the case of a linear accelerometer, several input signals may be fed through a coupling circuit to the integrator from each of the detectors which detect acceleration in several directions at once. It is also desirable that the input coupling circuit employed have a high output impedance in order to prevent discharge of the integral stored in the integrator when no input signal is present.

Heretofore, it has been the practice to capacitance couple the separate input signals into the integrator. Such practice has proven impractical, however, principally because the input impedance of the integrator is low and at the frequencies involved (generally less than 1 cycle per second) a high capacitance is required.

It is the principal object of the present invention to provide an improved input coupling circuit for an electrical readout integrator.

Another object of the invention is to provide such an improved input coupling circuit wherein a number of input signals may be fed to an electrical readout integrator while at the same time maintain isolation to D.C. between the separate input signals.

Still another object of the invention is to provide an improved input coupling circuit for an electrical readout integrator having a high output impedance.

In accordance with the present invention, an improved input coupling circuit for an electrical readout integrator is provided comprising a magnetic amplifier having a plurality of input control windings and an output control winding, the latter being connected across the input electrodes of the integrator. In order to more fully describe the invention, reference is made to the single figure of the accompanying drawing which schematically shows a circuit embodying the invention.

More specifically, an electrical readout integrator comprises a cell containing as electrolyte a solution of a reversible redox system, the solution being divided into three zones of different concentration of a measured species of such system, all zones being electrically connected through the electrolyte. One of the three zones is of variable concentration. It is called the "integral" zone. It is provided with two electrodes, one termed the "common" electrode, or integrator anode, the other the "readout" electrode, or integrator cathode. Another zone of concentration which is high in concentration of the measured species is referred to as a "reservoir" zone. It contains an electrode termed the "input" or reservoir electrode. Separating the integral zone and the reservoir zone is a zone dilute in the measured species of the redox system. It is provided with an electrode called a "shield" or scavenger electrode.

In operating an electrical readout integrator, a biasing voltage is applied across the common and readout electrodes, the common electrode being made the anode of the circuit, so as to furnish the readout current which is proportional to the concentration in the integral zone. A similar biasing voltage is applied across the shield and input electrodes, the latter being made the anode so as to maintain a high concentration of measured species in the reservoir zone and to clear the dilute zone of any ions of the measured species which may have escaped into it from the integral zone. With these electrodes biased as described, when a source of current is connected across the input electrode and the common electrode so that the latter is the anode, the concentration of the measured species of the redox system is increased in the integral zone. The increase can be read electrically on a suitable meter in the biasing circuit of the integral zone. When the current source is disconnected, the increased concentration of measured species is maintained in the integral zone by reason of the configuration and location of electrodes in that zone, and when the source is again connected, again an increase in concentration is noted. Thus, the device integrates the current applied to it over a period of time.

Referring now to the drawing, an electrical readout integrator E is diagrammatically represented. The biasing voltage across the readout electrode R and the common electrode C is provided by a battery $B_1$ connected so as to make the common electrode C the anode. The biasing voltage across the shield electrode S and the input electrode I is provided by a battery $B_2$ connected so as to make the input electrode I the anode of the circuit. Both batteries have the same voltage, suitably 0.9 volt.

To integrate input signals of both positive and negative polarities, it is necessary to provide a supply of measured species of the redox system in the integral compartment. For this purpose a source 10 of current is connected across the input electrode I and the common electrode C so that the latter is the anode of the circuit. A switch 12 is provided for connecting the source 10 of current into the circuit. A second switch 14 of the two-position type is also provided in the circuit. In its first position (position 1 or "integrating" position) the switch 14 connects the source 10 of current across the input and common electrodes I, C in order to set a predetermined level of integral in the integrator E. In its second position (position 2 or "clearing" position) with switch 12 open, switch 14 connects the positive side of battery $B_1$ to the input electrode I. This makes the input electrode I an anode with respect to the readout electrode R, and the iodine in the integral zone will be removed to the reservoir zone, thus clearing the integrator. It should be noted at this point that the electrodes I, C are both input electrodes for the integrator E. Also provided in the circuit is a resistor 16 to isolate the common electrode C from the rest of the circuit while the integral zone is being cleared. To determine the current output an ammeter M is also connected into the circuit.

In the circuit of the invention a magnetic amplifier 18 is provided having control windings 20, 22 for receiving separate input signals 1 and 2 from a pair of signal sources, not shown. The output winding 24 of the magnetic amplifier 18 is connected across the input electrodes I, C of the integrator E. A resistor 26 connected into the input circuit serves to limit the current passing between the input electrodes I, C. A power source 28 is also provided for operating the magnetic amplifier 18.

In the practice of the invention, the magnetic amplifier used in the circuit should possess the following characteristics:

(1) Very good linearity over the desired dynamic range of input signals;

(2) High output impedance (in the order of 100,000 ohms);

(3) Very low drift;

(4) Unity gain; and (5) Low D.C. resistance of the control windings.

While unity gain is preferred, it may be practical to employ a magnetic amplifier having a gain other than unity. Since the magnetic amplifier is used as a coupling device, gain can be exchanged for high output impedance which is more desirable. The high output impedance which shunts the input and common electrodes I, C, of the integrator E is desirable to prevent discharging the integral stored in the integrator E when no input signal is present. With present integrators, an output impedance of 100,000 ohms will allow integration times of up to several minutes without appreciable loss of integral.

In one circuit constructed in accordance with the invention, an electrical readout integrator was used containing an electrolyte in the iodine-iodide system. The input signals were fed separately to four control windings of a magnetic amplifier whose output winding was connected across the input electrodes of the integrator. A resistor of 1000 ohms was connected into the circuit in order to limit the current from the magnetic amplifier. The magnetic amplifier had the following characteristics:

Resistance of control windings—less than 800 ohms
Input signal rating—0.15 to 300 microamps (for each input control winding)
Signal source impedance—approx. 100K ohms shunted by 15 $\mu$f. capacitor
Output—dynamic range greater than ±600 microamps
Load—1K ohm
Output impedance—greater than 100K ohms
Linearity—approx. 0.1%
Gain—unity
Frequency response—flat within ±0.5% from 0.0008 c.p.s. to 0.3 c.p.s.

The integrator successfully integrated each one of the four input signals separately and the algebraic sum of the signals. The signals were approximately ±50 microamps at a frequency of about 0.1 cycle per second. When no input was present, the integrator held the integral for several minutes without appreciable loss of integral. The loss was less than 1 percent per minute and varied with the integral level.

It will be seen that the present invention provides an improved input coupling circuit for an electrical readout integrator. Specifically, the provision of a magnetic amplifier as the coupling device makes it possible to maintain isolation to D.C. between the separate input signals by preventing any D.C. connection between the separate control windings, yet couples the separate signals into the magnetic amplifier and thus into the integrator. The magnetic amplifier also provides a high impedance signal to the input electrodes of the integrator.

While the present invention has been described with particular reference to an electrical readout integrator having a shield electrode, it should be understood that the magnetic amplifier can be used in conjunction with an integrator wherein the shield electrode is eliminated or other means provided for preventing diffusion of measured species between the zones of concentration in the integrator.

I claim:

1. In combination, an electrical readout integrator; a magnetic amplifier having a plurality of input control windings and an output control winding; said integrator comprising a cell containing as an electrolyte a solution of a reversible redox system, said solution being divided into zones of different concentration of a measured species of said system, a readout electrode and a common electrode in one of said zones having a variable concentration of said measured species and an input electrode in another of said zones high in concentration of said measured species; means for biasing said readout electrode negative with respect to said common electrode, said output control winding of said magnetic amplifier being connected across said input and common electrodes of said integrator.

2. The combination of claim 1 wherein a source of current is provided across said input and common electrodes of said integrator for supplying a predetermined amount of said measured species of said system in said zone of variable concentration.

3. The combination of claim 1 wherein a resistor is connected in series with said output control winding of said magnetic amplifier for limiting the current between said input and common electrodes of said integrator.

4. The combination of claim 1 wherein said magnetic amplifier has a high output impedance.

5. In combination, an electrical readout integrator; a magnetic amplifier having a plurality of input control windings and an output control winding; said integrator comprising a cell containing as an electrolyte a solution of a reversible redox system, said solution being divided into zones of different concentration of a measured species of said system, a readout electrode and a common electrode in one of said zones having a variable concentration of said measured species, an input electrode in another of said zones high in concentration of said measured species and a shield electrode in a zone dilute in said measured species; first means for biasing said readout electrode negative with respect to said common electrode; and second means for biasing said shield electrode negative with respect to said input electrode, said output control winding of said magnetic amplifier being connected across said input and common electrodes of said integrator.

References Cited by the Examiner

UNITED STATES PATENTS

| | | | |
|---|---|---|---|
| 2,685,025 | 7/1954 | Root | 340—13 |
| 2,809,303 | 10/1957 | Collins | 330—3 X |
| 3,054,031 | 9/1962 | Estes et al. | 317—231 |

OTHER REFERENCES

Reed et al.: "Solion Principles of Electrochemistry and Low Power Electrochemical Devices"; published by U.S. Naval Ordnance Laboratory in 1957; available to the public Sept. 12, 1958 via OTS; OTS designation PB131931.

JOHN W. HUCKERT, *Primary Examiner.*

A. S. KATZ, J. D. KALLAM, *Assistant Examiners.*